June 10, 1930.  F. A. DAVIDSON  1,762,572
COUPLING DEVICE
Filed Aug. 28, 1928    2 Sheets-Sheet 1
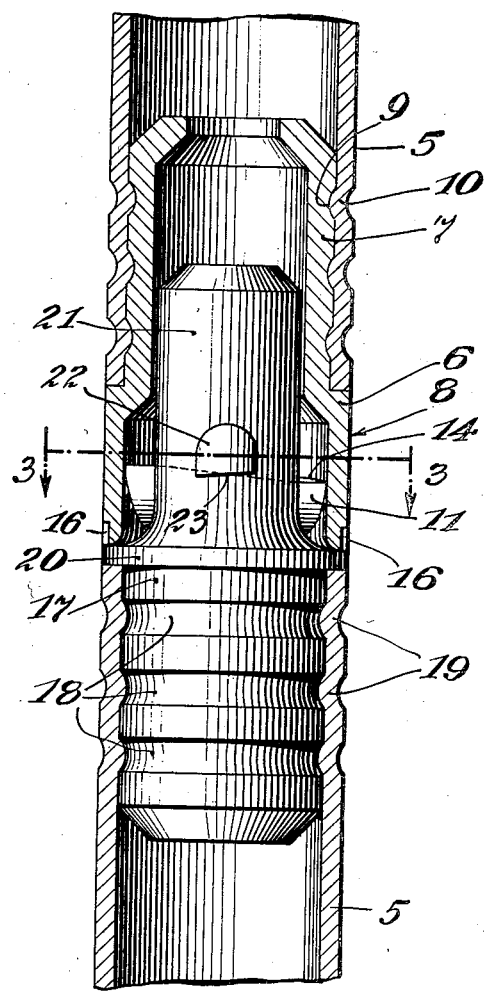
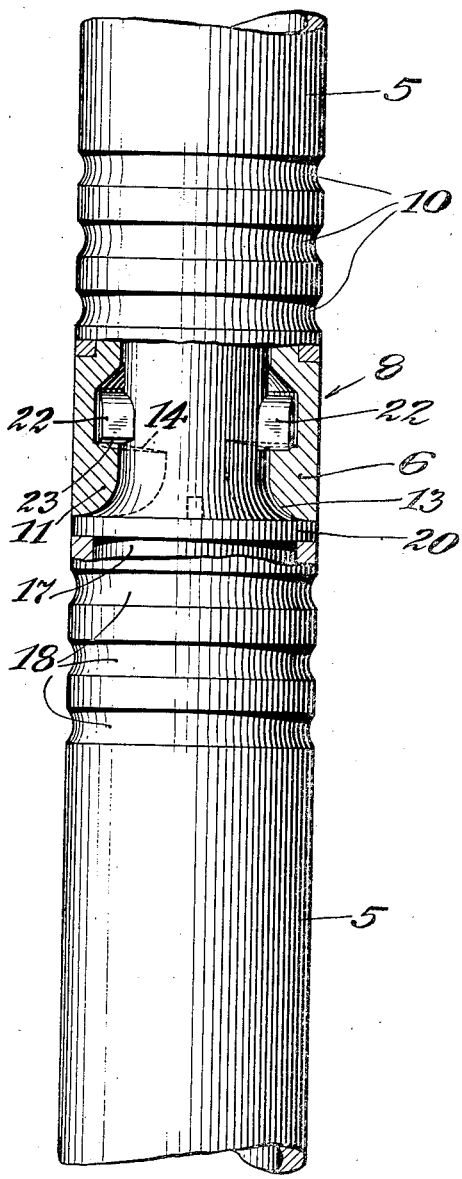
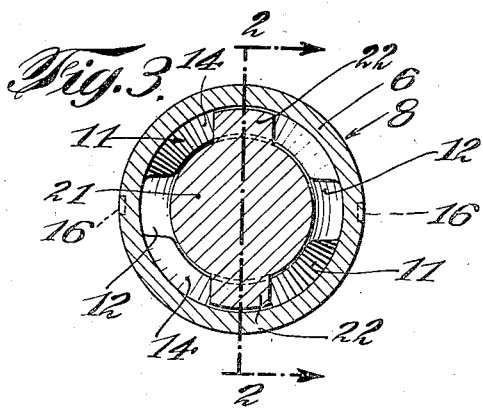
INVENTOR
Frederic A. Davidson
BY
his ATTORNEY

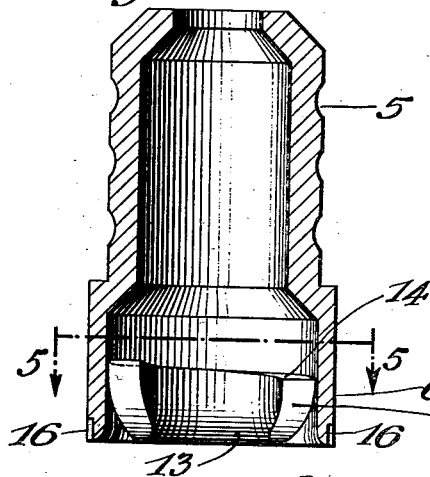
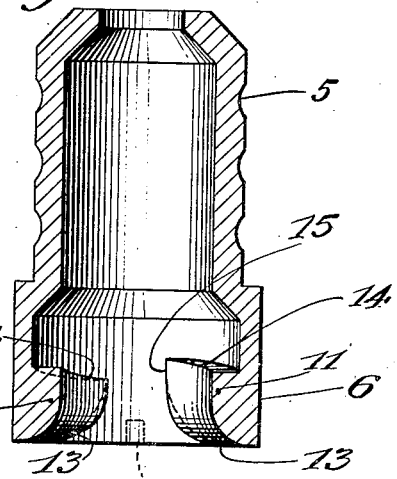
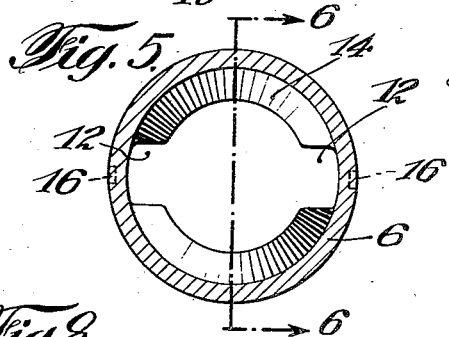
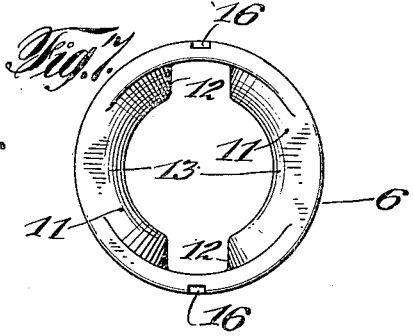
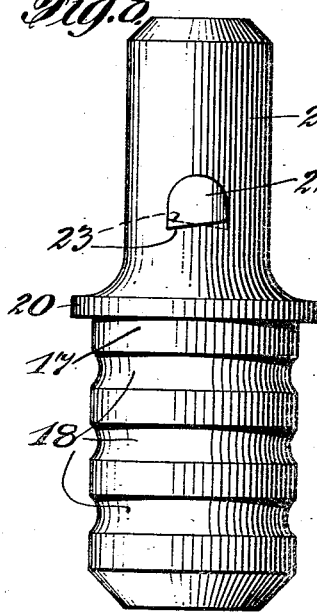
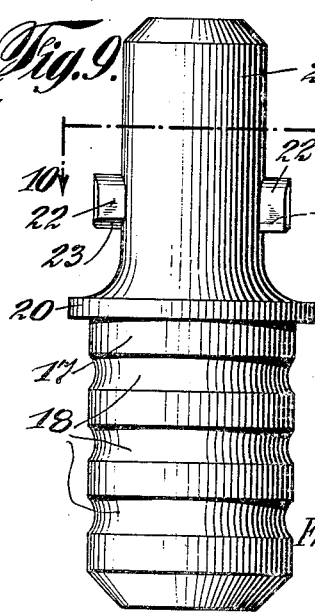
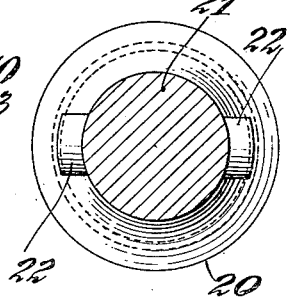

Patented June 10, 1930

1,762,572

UNITED STATES PATENT OFFICE

FREDERIC A. DAVIDSON, OF CHICAGO, ILLINOIS, ASSIGNOR TO AMERICAN SAFETY DEVICE CO., OF NEW YORK, N. Y., A CORPORATION OF NEW YORK

COUPLING DEVICE

Application filed August 28, 1928. Serial No. 302,472.

This invention relates to coupling devices, and has for its primary object and purpose to provide a simply and durably constructed device whereby the ends of tube sections constituting supporting and bracing elements for towers, scaffold platforms and other structures may be easily, quickly and securely coupled together. The device to be hereinafter described particularly lends itself for use in such knock-down tower or supporting structures, as it enables the numerous sectional supporting columns, braces and struts to be rapidly assembled with an assurance of entire security in the connection between the parts and also permitting the several sections to be as readily disassembled and compactly arranged for convenience in transportation or storage within a relatively small space.

In one practical embodiment of my invention, I provide male and female coupling members permanently secured in the opposite ends of each tube section, said female member having opposed internal ribs or shoulders provided with inclined camming surfaces and the male member being provided on diametrically opposite sides and intermediate of its ends with lugs adapted to pass between the opposed ends of the shoulders of said female member and having inclined faces to cooperate with said cam surfaces of the shoulders when the parts are relatively rotated to thereby draw the coupling members together and retain the same in closely connected relation. It is an important feature of the invention to so arrange said ribs or shoulders of the female member relative to each other that the high end of one of said shoulders is opposed to the low end of the other shoulder, said high ends of the cam shoulders acting as stops limiting the relative rotation of the male and female coupling members to position the lugs on the male member in line with the spaces between said shoulders whereby the parts may be disconnected.

It is also another object of the invention to provide external means on the female coupling member indicating the positions of the entrance spaces between the cam shoulders for the lugs on the male coupling member so that the operator is enabled to very quickly properly assemble and connect the two parts of the coupling.

With the above and other objects in view, the invention consists in the improved coupling device and in the form, construction and relative arrangement of its several parts as will be hereinafter more fully described, illustrated in the accompanying drawings and subsequently incorporated in the subjoined claim.

In the drawings, wherein I have disclosed one simple and practical embodiment of the invention, and in which similar reference characters designate corresponding parts throughout the several views,—

Figure 1 is a longitudinal section showing two tube sections connected by means of my improved coupling device;

Fig. 2 is a side elevation partly in section along the line indicated at 2—2 in Fig. 3;

Fig. 3 is a horizontal section taken on the line 3—3 of Fig. 1;

Fig. 4 is a detail sectional view of the female coupling member;

Fig. 5 is a horizontal section taken on the line 5—5 of Fig. 4;

Fig. 6 is a sectional view similar to Fig. 4 taken on the line 6—6 of Fig. 5;

Fig. 7 is an end elevation of the female coupling member;

Figs. 8 and 9 are detail elevations of the male coupling member, and

Fig. 10 is a horizontal sectional view taken on the line 10—10 of Fig. 9.

Referring in detail to the drawings, 5 designates the end portions of two metal tubes which are adapted to be coupled together, and each of which is provided at one of its ends with a male coupling member and at its opposite end with a female coupling member. As shown in the drawings, the female coupling member generally indicated at 6 is in the form of a hollow metal casting having a shank portion 7 of reduced diameter and a head 8 having an external diameter equal to the external diameter of the tube 5. The shank 7 is provided with spaced external annular grooves 9 and is adapted to snugly fit within the end of the tube 5. The wall of the tube at spaced points is then forced inwardly under pressure and into the several grooves 9 as indicated at 10, thus rigidly and permanently locking the shank 7 within the end of the tube.

The wall of the head 9 of the coupling member 6 is internally formed with opposed circumferentially extending ribs or shoulders 11, the ends of which are spaced apart as at 12 to provide entrances for the coupling lugs on the male member to be later described. These shoulders are of appreciable width and the outer edges thereof are rounded or convex as indicated at 13 and merge into the end edge of the wall of the head 8. The inner circumferentially extending edges of these shoulders 11 are obliquely inclined in relatively opposite directions to provide cam surfaces 14 so that the shoulders vary in width from one end to the other. The wider end of one of the shoulders is opposed to the narrower end of the other shoulder, thus providing an abutment face 15 at the high end of the cam which acts as a stop for the lug on the male coupling member and limits the relative turning movement of the two coupling members in opposite directions.

Upon the outer face of the cylindrical head 8 of the coupling member 6 and in line with the entrances 12 between the shoulders 11, notches or recesses 16 are formed to provide a suitable indicating means for convenient use in aligning the coupling lugs of the male member with said entrances.

The male coupling member shown at 17 is preferably of solid construction having a body portion adapted to be fitted within the end of the tube 5 and provided with the spaced annular grooves 18 into which the metal wall of the tube is compressed as shown at 19 to permanently lock the coupling member in connection with the tube end in the same manner as above described in connection with the female coupling member. At one end of this body portion of the member 17 the laterally projecting annular flange 20 is formed and a shank 21 of reduced diameter projects axially from this flange, said shank being of a length substantially equal to the length of the body portion of the coupling member. Upon this shank at diametrically opposite sides thereof and intermediate of its ends the lugs 22 are formed, said lugs having the reversely inclined or sloping faces 23.

In assembling the tube sections 5 to provide a supporting or bracing unit of the desired length, it is only necessary to insert the shank extension 21 of the male coupling element projecting from the end of one tube section through the head 8 of the coupling member 6 on the end of another tube section, the lugs 22 on shank 21 being arranged substantially in line with the recesses 16 so that said lugs will move through the entrances 12 between the ends of the internal shoulders 11 of the coupling member 6. From reference the Figs. 1 and 8 of the drawings, it will be noted that the entering sides of the lugs 22 are rounded or convex as indicated at 22'. Thus in the event that these lugs may not be accurately aligned with the entrances 12, upon the relative turning movement of the parts, the convex surfaces of these lugs riding on the convex surfaces of the shoulders 12 will operate to automatically direct the lugs into and through the entrances 12, thus greatly facilitating the assemblage of the parts. When the end of said coupling member is brought substantially in contact with the flange 20, the two coupling members and the tubes 5 are given a relative rotation so that the inclined faces 23 will ride upon the cam surfaces 14 of the respective shoulders 11, the progressive frictional movement to such relative turning movement of the coupling members acting to draw said members tightly together and hold the end of the head 8 on the member 6 in close abutting contact against the flange 20 on the member 17. The shank 21 of the male coupling member extends into the hollow shank extension 7 of the female coupling member 6, and coacts therewith to resist angular movement of the connected metal tubes 5 relative to the axis of the coupling. It will be evident that by means of such a coupling device, it is possible to very rapidly couple together a large number of the tube sections whereby the erection of the desired structure may be greatly facilitated. Also, it will be seen that my new coupling device provides a very rigid and substantial connection between the tube sections which will withstand severe strains and is not likely to be accidentally uncoupled. No special tools are required in order to couple the parts together and they can also be as readily uncoupled merely by the application of manual exertion to impart the proper relative rotational movement to the connected ends of the metal tubes. Such movement will be limited by contact of the lugs 22 with the abutment end faces 15 of the shoulders 11 as above observed, when the two coupling members can then be drawn apart and the tubes 5 disconnected or separated from each other. Since the coupling members remain permanently attached to the tubes 5, there is no liability of their loss and the disconnected tubes can be bound together and readily transported from place to place.

From the foregoing description, it will be seen that I have devised a very simple, reliable and effective coupling means for the elements of sectional tubular scaffold supports, temporary sidewalk bridges, towers, and other like structures which enables the same to be easily and quickly erected or knocked down and transported to another position for use. I have shown a particular embodiment of the device which has been found to be entirely practical and satisfactory in actual use. It is however, to be understood that the essential features of my present improvements might also be incorporated in various other alternative structures, and I accordingly reserve the privilege of resorting to all such legitimate changes therein as may be fairly embodied within the spirit and scope of the invention as claimed.

I claim:

In combination with tubular members to be coupled together, male and female coupling members respectively secured permanently in the opposite end of each member, said female coupling member being of hollow construction and having internal opposed circumferentially extending shoulders, the opposed ends of said shoulders being spaced apart and the outer edges of the shoulders being convex and merging into the end face of the wall of said coupling member, said shoulders at their inner edges having circumferentially inclined cam surfaces, and the male coupling member consisting of a solid shank having a part of large diameter fixed in the end of the tubular member and a part of relatively small diameter projecting axially therefrom with an intermediate flange of the same diameter as said tubular member and abutting against the end edge thereof, said reduced portion of the male coupling member being provided at its opposite sides and intermediate of its ends with lugs adapted to engage said convex surfaces of the shoulders on the female coupling member and be directed thereby inwardly between the opposed ends of said shoulders, said lugs having reversely inclined faces to ride upon the cam surfaces of the said shoulders upon relative turning movement of the coupling members to thereby draw the coupling members axially in relatively opposite directions and frictionally lock the same in coupled relation.

In testimony that I claim the foregoing as my invention, I have signed my name hereto.

FREDERIC A. DAVIDSON.